United States Patent [19]

Romano

[11] 4,318,872
[45] Mar. 9, 1982

[54] ABSORBER INTERCOOLER

[75] Inventor: Giuliano Romano, Englewood, N.J.

[73] Assignee: National Distillers & Chemical Corp., New York, N.Y.

[21] Appl. No.: 112,003

[22] Filed: Jan. 14, 1980

[51] Int. Cl.³ .............................................. B01F 3/04
[52] U.S. Cl. ................................. 261/140 A; 62/484; 165/60; 261/153; 261/155; 261/161
[58] Field of Search ............... 261/110, 112, 152, 153, 261/155, 140 R, 140 A, 158–161; 165/60; 62/484

[56] References Cited

U.S. PATENT DOCUMENTS

| | | | |
|---|---|---|---|
| 2,428,922 | 10/1947 | Shoresman | 261/110 X |
| 3,274,752 | 9/1966 | Huyghe et al. | 261/153 X |
| 3,317,197 | 5/1967 | Lohner et al. | 261/112 X |
| 3,318,588 | 5/1967 | Russell et al. | 261/112 X |
| 3,364,982 | 1/1968 | Jaffe | 261/112 X |
| 3,499,734 | 3/1970 | Newman et al. | 261/153 X |
| 3,547,591 | 12/1970 | Torres | 261/112 X |
| 3,894,133 | 7/1975 | Coste | 261/153 |

*Primary Examiner*—Richard L. Chiesa
*Attorney, Agent, or Firm*—Kenneth D. Tremain

[57] ABSTRACT

An absorber intercooler having a heat exchanger formed integrally therein. The absorber intercooler includes a cylindrical outer casing having a tube bundle disposed longitudinally therein. Inlet and outlet ports are provided in the cylindrical casing to allow for the flow of refrigerant around the tube bundle. Upper and lower end plates, having a plurality of openings therein, seal the upper and lower ends of the bundle. A liquid inlet pipe provides a flow of liquid absorbent through the upper end plate into the tube bundle. A vapor inlet pipe provides a flow of vapor into the bottom of the intercooler, and the vapor flows through a central opening in the lower end plate into a centrally disposed vapor flow pipe. The vapor flows upwardly therein through the upper end plate. A cap is provided on the upper end of the vapor flow pipe to prevent liquid absorbent from flowing down into the pipe, and also provides for an even radial distribution of the vapors at the cap. A distributor pan is positioned below the aforementioned cap, and provides for an even distribution of the resultant liquid into the tube bundle.

6 Claims, 4 Drawing Figures

ABSORBER INTERCOOLER

BACKGROUND OF THE INVENTION

1. Field of the Invention

The absorber intercooler of the present invention relates generally to apparatus for the separation of gases, and more particularly pertains to a heat exchanger employed in apparatus of the above-mentioned type which removes heat released during an absorption process.

2. Discussion of the Prior Art

As is well known in the prior art, an absorption process occurs when a vapor, which may be composed of a plurality of gases, is mixed with a liquid which has an affinity for a particular gas within the vapor. In one particular process, a liquid including light hydrocarbons is utilized to absorb an ethylene gas. The absorption process releases heat which had been dissipated in the prior art through the use of a separate, external heat exchanger. A disadvantage with the prior art approach is that the external heat exchanger has proved to be expensive and too costly when the absorption process involves small quantities of liquid and vapor. When the absorption process is conducted on a relatively small scale, it is too costly to provide an external means for cooling the mixture. The present invention is therefore directed to alleviating the cost and expense of external methods of cooling an absorption process, and accordingly overcomes the disadvantages set forth hereinabove.

SUMMARY OF THE INVENTION

In accordance with the teachings of the present invention, an absorber intercooler is provided with a heat exchanger constructed integrally therein. Vapor and liquid supplies are mixed within a unique configuration in the intercooler and the temperature therein is maintained at low levels by the heat exchanger.

Accordingly, an object of the present invention is the provision of a novel heat exchanger arrangement providing for the dissipation of heat released by the absorption of ethylene by a hydrocarbon liquid, particularly in small scale applications.

Another object of the invention is to provide a novel apparatus in which ethylene and liquid hydrocarbons are both mixed and cooled. By providing such cooling, the absorber intercooler satisfactorily dissipates heat generated by the exothermal absorption process and also allows continual mixing of the liquid and vapor. It is therefore unnecessary to provide any external cooling of the vapor or the mixture.

A further object of the invention is to provide a more efficient means for internally absorbing the heat generated within an absorber intercooler. A novel arrangement for distributing the mixture uniformly across a tube bundle in the intercooler, also provides an optimum amount of heat exchange.

In a preferred embodiment, the absorber intercooler of the present invention includes a cylindrical casing having a tube bundle disposed longitudinally therein. Inlet and outlet ports are provided in the cylindrical casing to allow for the flow of refrigerant around the tube bundle. Upper and lower end plates, having a plurality of openings therein, seal the upper and lower ends of the tube bundle. A liquid inlet pipe provides a flow of liquid absorbent through the upper end plate into the tube bundle. A vapor inlet pipe provides a flow of vapor into the bottom of the intercooler, and the vapor flows through a central opening in the lower end plate into a centrally disposed vapor flow pipe. The vapor flow pipe extends longitudinally through the absorber intercooler within the tube bundle, and extends past the upper end plate terminating within the liquid inlet pipe. A cap is provided on the upper end of the vapor flow pipe to prevent liquid absorbent from flowing down into the pipe, and also provides for an even radial distribution of the vapors at the cap. A distributor pan is positioned below the aforementioned cap and above the upper ends of the tube bundle, and provides for an even distribution of the liquid into the tube bundle. The upper edge of the pan may be V-notched to allow an even flow of the liquid over the sides of the pan.

BRIEF DESCRIPTION OF THE DRAWINGS

The foregoing and other objects, advantages and characterizing features of the present absorber intercooler will become more clearly apparent from the ensuing detailed description of an illustrative embodiment thereof, taken together with the accompanying drawings wherein identical reference numerals denote like parts throughout the various views, and in which.

DETAILED DESCRIPTION OF THE DRAWINGS

Figure 1:
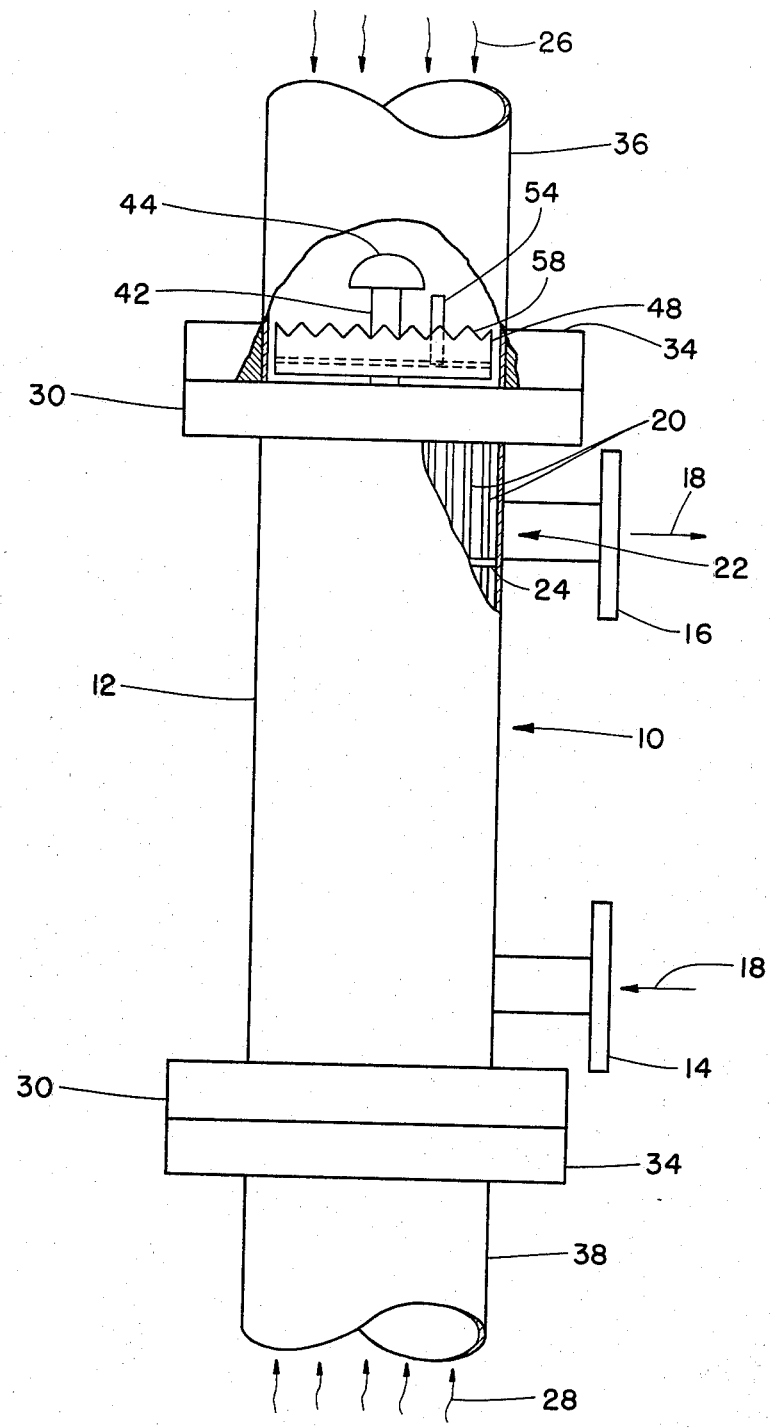
FIG. 1 is a side elevational view of an absorber intercooler of the present invention with portions broken away and shown partially in cross section to more clearly illustrate the internal structure thereof.
Figure 2:
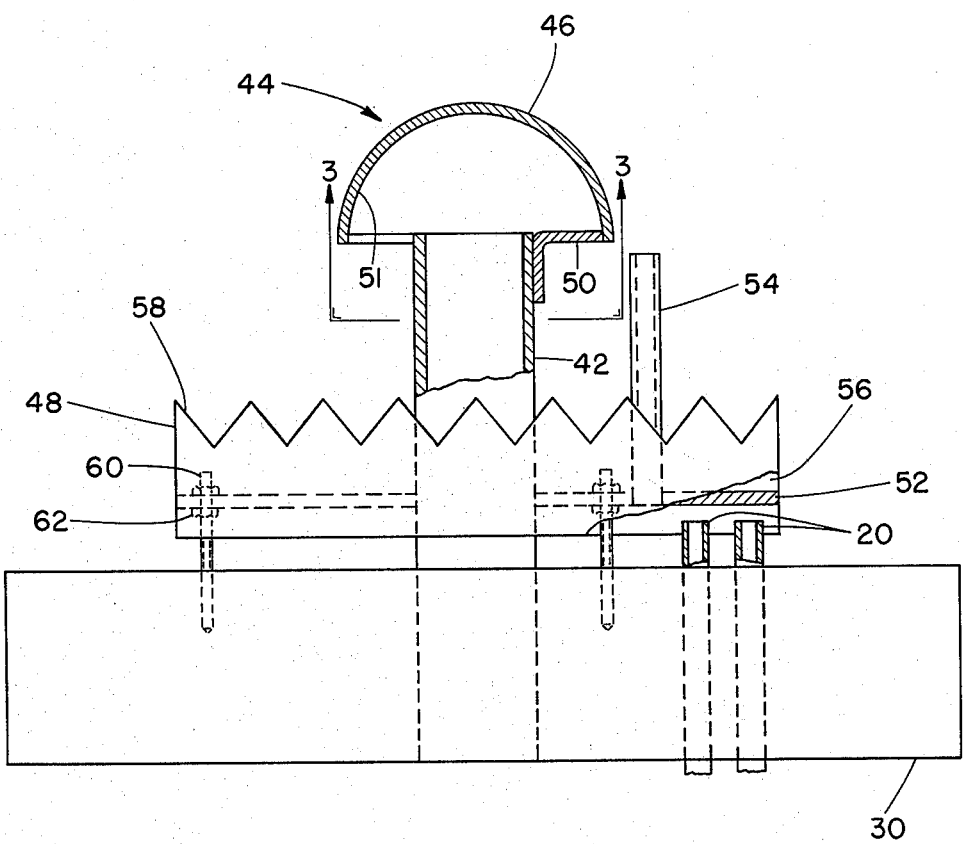
FIG. 2 is an enlarged view of the top of the absorber intercooler, partically broken away to more clearly show its internal structure.
Figure 3:
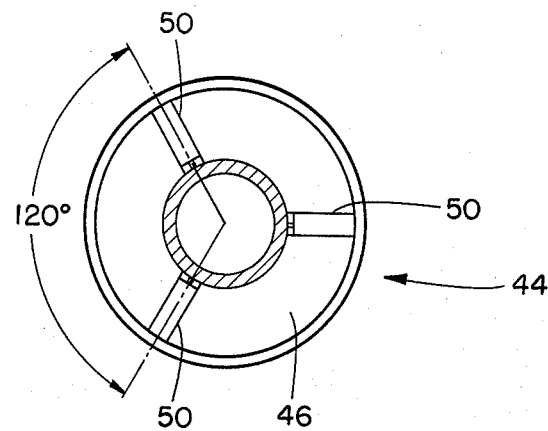
FIG. 3 is a view taken along line 3—3 of FIG. 2 and illustrates details of the vapor flow cap and its brackets.
Figure 4:
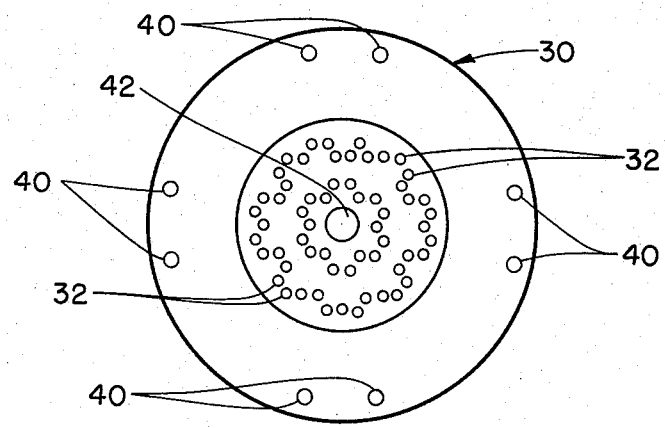
FIG. 4 is a plan view of an end plate in the intercooler, and also illustrates the pattern of the plurality of tubes extending longitudinally through the intercooler.

Referring now to the drawings in detail, an absorber intercooler 10 is constructed in accordance with the teachings of the present invention includes an outer cylindrical casing 12 with an inlet port 14 and an outlet port 16 to provide for the flow of a refrigerant 18 therein. A plurality of tubes 20 form a tube bundle 22 extending longitudinally within the outer casing 12 which are bound and supported by tie bars 24. The tube bundle 22 provides for the counter-current flow therethrough of liquid 26 which may be a light hydrocarbon film and vapor 28 which may be an ethylene vapor. Upper and lower end plates 30 are provided near both ends of the tube bundle, and each end plate has a plurality of axially extending openings 32 formed therein through which the tubes 20 project. As illustrated in FIG. 2, the upper ends of the tubes 20 (only two are illustrated) extend through the upper end plate 30 and project a given distance thereabove. In the illustrated embodiment, the openings 32 and tubes 20 are positioned in a nonsymmetrical pattern. Flanges 34 are provided on a liquid inlet pipe 36 and a vapor inlet pipe 38 to fasten and seal those elements to the end plates 30, as by bolts extending through holes 40 provided in the end plates 30. A vapor flow pipe 42 passes centrally through the upper and lower end plates 30, and allows vapor 28 to flow from the vapor inlet pipe 38 upwardly through the absorber intercooler to a vapor flow cap 44 provided above the upper end plate 30. The vapor flows upwardly mainly through central pipe 42 as this flow path is the path of least resistance provided by the design of the absorber intercooler. The vapor flow cap 44 serves several functions. The cap 44 is designed substantially hemispherical in shape with an open lower portion. The top surface 46 of the cap prevents liquid 26 from the liquid inlet pipe 36 from flowing directly into the vapor flow pipe, reserving the latter pipe primarily for upwardly flowing vapors. The top surface 46 redirects the liquid which is incident thereon outwardly with an even radial pattern into a distributor pan, or weir, 48. The lower surface 51 of the cap 44 redirects the upwardly flowing vapors outwardly and downwardly in a substantially even radial pattern into contact with the liquid 26. A set of radially extending brackets 50 fasten the cap 44 to the vapor flow pipe 40 while providing minimal interference to the outwardly directed vapor flow.

The distributor pan 48 is an open-ended cylinder which permits the vapor 28 to mix with the liquid 26 and, more importantly, functions to distribute the mixture evenly across the projecting tops of the tubes 20. The bottom of the distributor pan is formed by surface 52, and liquid entering the intercooler from inlet pipe 36 is collected in the pan until the collected volume of liquid spills over the upper surfaces thereof. The bottom surface of the pan is provided with several apertures or openings. A first centrally located opening allows the vapor flow pipe 42 to pass therethrough, and a second opening is provided to allow a distributor pan vent pipe 54 to pass through. The vent pipe 54 provides for the release of gases trapped within the space between the lower surface 52 of reservoir 56 and the tops of the protruding tubes 20. V-shaped notches 58 are cut into the topmost edge of the distributor pan 48 to permit the mixture to flow evenly over the sides of the distributor pan. The notches are well known in the art and are formed by cutting substantially 90° angle notches into the upper edge of the distributor pan. Bolts 60 and nuts 62 are provided to fasten the distributor pan 48 to the upper end plate 30. A space is provided between the bottom wall 52 and the upper end plate 30 for clearance above the upper ends of tubes 20. The distributor pan 48 is positioned above substantially all of the protruding tubes. The configuration of the distributor pan 48 is designed to provide an even flow of mixture through all of the tubes in the bundle. It should also be noted that for best results, the distributor pan 48 should be levelled in relation to the plane formed by the tops of the projecting tubes 20.

In operation, refrigerant 18 is pumped into the heat exchanger 10 through inlet port 14. A vapor 28, having ethylene as a component, flows in the vapor inlet pipe 38 into the vapor flow pipe 42 and flows up the pipe to cap 44 where it is directed radially outwardly. A liquid 26, typically a light hydrocarbon film, flows in the liquid inlet pipe 36 and collects in the reservoir of the distributor pan. The vapor also enters the reservoir and contacts the liquid therein. The mixture flows over the notched edges 58 of the distributor pan 48, and then onto the end plate 30. The mixture collects on the plate until it reaches the level of the top openings in the tubes 20. Thereafter, the mixture flows uniformly as a film in contact with the internal surfaces of the tubes 20 down through the absorber intercooler. Refrigerant 18 circulates around the exterior surfaces of the tubes 20, and provides sufficient cooling to remove heat released by the exothermic absorption process.

In one designed embodiment of the present invention: Vapor 28 in the form of a feed gas is fed into the intercooler at 8,000 16/hr at a temperature of −25° F.; an isobutane absorbent 26 is pumped into the intercooler at a rate of 3500 16/hr at a temperature of −25° F.; the intercooler is pressurized to 465 psig; and propylene liquid at −35° F. is utilized as the coolant.

From the foregoing, it should be apparent that the objects of the present invention have been fully accomplished, and a novel absorber intercooler has been provided. However, it should be realized that different modifications and embodiments are contemplated without departing from the broad spirit and scope of this invention as defined by the appended claims.

What is claimed is:

1. An absorber intercooler providing for the absorption of a vapor into an absorbent liquid and having a heat exchanger constructed integrally therein, comprising:
   a. means for supplying vapor to the bottom of the intercooler;
   b. means for supplying an absorbent liquid to the top of the intercooler;
   c. means providing for mixing of the vapor and liquid absorbent in the intercooler;
   d. a heat exchanger constructed as an integral part of the absorber intercooler having a cylindrical outer casing with refrigerant inlet and outlet ports, said ports having a coolant flow longitudinally therebetween in said heat exchanger, a tube bundle extending longitudinally within said cylindrical casing, said heat exchanger comprising upper and lower end plates, through which said tube bundle extends, to seal the upper and lower ends of the tube bundle; and
   e. said absorber intercooler further comprising a vapor flow pipe centrally disposed in said cylindrical casing and longitudinally extending along the length and to the top of the intercooler to enable only vapor to flow therethrough to the top of the intercooler in a direction opposite to the flow of liquid absorbent and vapor mixture, and from which it flows down said tube bundle with the liquid absorbent opposite to the direction of the coolant flowing in said heat exchanger.

2. An absorber intercooler providing for the absorption of a vapor into an absorbent liquid as claimed in claim 1, said tube bundle and vapor flow pipe projecting above said upper end plate.

3. An absorber intercooler providing for the absorption of a vapor into an absorbent liquid as claimed in claim 2, a vapor flow pipe fastened to the uppermost end of said vapor flow cap and having openings to release the vapor while preventing absorbent liquid from entering the flow pipe, and a distributor pan positioned below said cap and above the upper ends of said tube bundle to provide for an even flow of liquid into the tube bundle.

4. An absorber intercooler providing for the absorption of a vapor into an absorbent liquid and having a heat exchanger constructed integrally therein, comprising:
   a. means for supplying vapor to the bottom of the intercooler;
   b. means for supplying an absorbent liquid to the top of the intercooler;

c. means providing for mixing of the vapor and liquid absorbent in the intercooler;

d. a heat exchanger constructed as an integral part of the absorber intercooler having a cylindrical outer casing with refrigerant inlet and outlet prots, said ports having a coolant flowing longitudinally therebetween in said heat exchanger, a tube bundle extending longitudinally within said cylindrical casing, said heat exchanger comprising upper and lower end plates, through which said tube bundle extends, to seal the upper and lower ends of the tube bundle;

e. said absorber intercooler further comprising a vapor flow pipe centrally disposed in said cylindrical casing and longitudinally extending along the length of the intercooler and above said upper end plate to enable only vapor to flow therethrough to the top of the intercooler, from which it flows down said tube bundle with the liquid absorbent; and f. said vapor flow pipe having a vapor flow cap fastened to the uppermost end thereof having openings to release the vapor while preventing absorbent liquid from entering the flow pipe, and a distributor pan positioned below said cap and above the upper ends of said tube bundle to provide for an even flow of liquid into said tube bundle.

5. An absorber intercooler as defined in claim 3 or 4, said distributor pan comprising a vent pipe for the release of gases trapped within a space between the upper ends of said tube bundle and beneath said distributor pan.

6. An absorber intercooler as defined in claim 3 or 4, said openings in said vapor flow cap therein to evenly distribute said vapor into said distributor cap.

* * * * *